US012578070B2

(12) United States Patent
　Ohta et al.

(10) Patent No.: US 12,578,070 B2
(45) Date of Patent: Mar. 17, 2026

(54) HEADLAMP UNIT WITH HIGH BEAM AND LOW BEAM LENSES FOR SADDLE RIDING VEHICLE

(71) Applicants: KAWASAKI MOTORS, LTD., Akashi (JP); KOITO MANUFACTURING CO., LTD., Tokyo (JP)

(72) Inventors: Masaya Ohta, Akashi (JP); Hiroyuki Harada, Shizuoka (JP); Toru Kurebayashi, Shizuoka (JP)

(73) Assignees: KAWASAKI MOTORS, LTD., Hyogo (JP); KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/935,809

(22) Filed: Nov. 4, 2024

(65) Prior Publication Data

US 2025/0146638 A1　May 8, 2025

(30) Foreign Application Priority Data

Nov. 6, 2023　(JP) ................................. 2023-189585

(51) Int. Cl.
| | |
|---|---|
| *F21S 41/20* | (2018.01) |
| *B62J 6/022* | (2020.01) |
| *F21S 41/37* | (2018.01) |
| *F21S 41/65* | (2018.01) |
| *F21W 102/13* | (2018.01) |

(52) U.S. Cl.
CPC .......... *F21S 41/2805* (2024.05); *B62J 6/022* (2020.02); *F21S 41/37* (2018.01); *F21S 41/65* (2018.01); *F21W 2102/13* (2018.01)

(58) Field of Classification Search
CPC .. F21S 41/20; F21S 41/24; F21S 41/25; F21S 41/255; F21S 41/26; F21S 41/265; F21S 41/27; F21S 41/275; F21S 41/285; F21S 41/29; F21S 41/295; B62J 6/02; B62J 6/022; B62J 6/024
See application file for complete search history.

(56) References Cited

U.S. PATENT DOCUMENTS 9,441,804 B2 * 9/2016 Oguchi .................... B62J 6/026

FOREIGN PATENT DOCUMENTS

| | | | |
|---|---|---|---|
| DE | 10 2019 125 198 | 4/2020 | |
| EP | 3 115 286 | 5/2020 | |
| JP | 2019119439 A * | 7/2019 | .............. F21S 43/00 |
| JP | 2021-30755 | 3/2021 | |

* cited by examiner

*Primary Examiner* — Robert J May
(74) *Attorney, Agent, or Firm* — Wenderoth, Lind & Ponack, L.L.P.

(57) ABSTRACT

A headlamp unit includes: two low beam outer lenses that are arranged side by side on left and right at an interval and transmit a low beam forward; and a single high beam outer lens that is disposed on a right side with respect to a left end of one of the two low beam outer lenses that is disposed on a left side and, at a same time, on a left side with respect to a right end of one of the two low beam outer lenses that is disposed on a right side, is disposed above or below the two low beam outer lenses with a space, and transmits a high beam forward.

12 Claims, 4 Drawing Sheets

HEADLAMP UNIT WITH HIGH BEAM AND LOW BEAM LENSES FOR SADDLE RIDING VEHICLE

TECHNICAL FIELD

The present disclosure relates to a headlamp unit and a saddle riding vehicle.

BACKGROUND ART

JP 2021-30755 A discloses a headlamp unit for a saddle riding vehicle including an outer lens in which a high beam and a low beam are lit.

SUMMARY

According to the headlamp unit described in JP 2021-30755 A, since a single outer lens includes a light source for irradiating a high beam and a low beam, the size of the outer lens is accordingly large.

An object of the present invention is to provide a headlamp unit having a downsized outer lens and a saddle riding vehicle including such a headlamp unit.

The present disclosure provides a headlamp unit including:

two low beam outer lenses that are arranged side by side on left and right at an interval and transmit a low beam forward; and a single high beam outer lens that is disposed on a right side with respect to a left end of one of the two low beam outer lenses that is disposed on a left side and, at a same time, on a left side with respect to a right end of one of the two low beam outer lenses that is disposed on a right side, is disposed above or below the two low beam outer lenses with a space, and transmits a high beam forward.

According to the headlamp unit of the present disclosure, a single high beam outer lens is disposed, in the left-right direction, between the left and right low beam outer lenses, and is disposed above or below the low beam outer lenses with a space, and a lens for a low beam and a lens for a high beam are different from each other. Therefore, light sources for irradiating respective ones of a high beam and a low beam do not need to be housed in a single lens; therefore, it is possible to make the size of each outer lens smaller.

BRIEF DESCRIPTION OF THE DRAWINGS

The foregoing and the other features of the present disclosure will become apparent from the following description and drawings of an illustrative embodiment of the disclosure in which.

DETAILED DESCRIPTION

Hereinafter, an embodiment of the present disclosure will be described with reference to the accompanying drawings. Note that, the drawings may be partially simplified for easy understanding.

Figure 1:
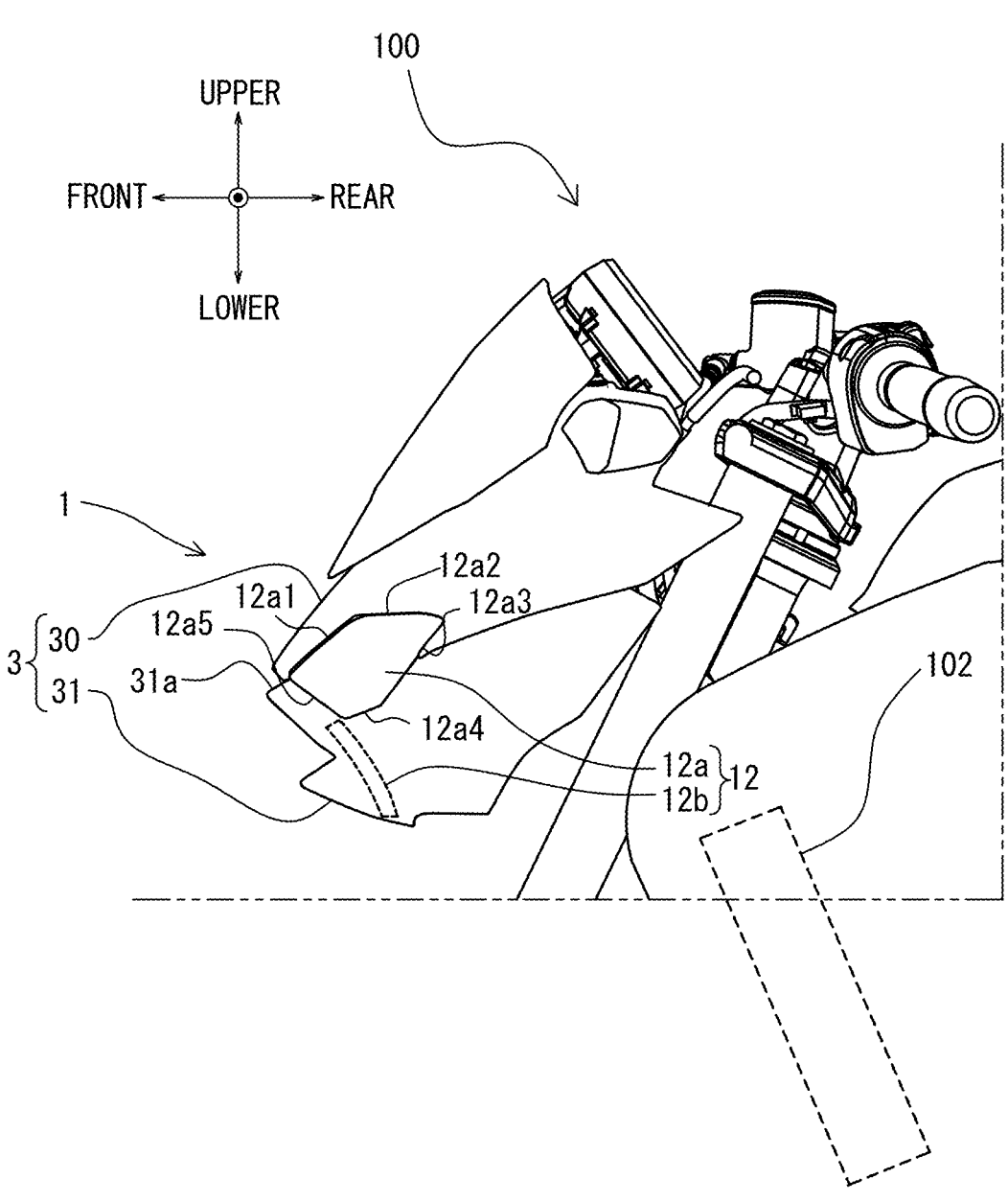
FIG. 1 is a side view of a front part of a saddle riding vehicle including a headlamp unit according the present embodiment.

FIG. 1 is a side view of a front part of a saddle riding vehicle 100 including a headlamp unit 1 according the present embodiment. In the present specification, "front", "rear", "left", and "right" respectively refer to the front direction, the rear direction, the left direction, and the right direction as viewed from a driver riding and driving the saddle riding vehicle 100. In addition, a height direction of the saddle riding vehicle 100 is defined as the vertical direction. For example, the left-right direction corresponds to the vehicle width direction of the saddle riding vehicle 100.

The headlamp unit 1 of the present embodiment is a lamp unit for illuminating ahead of the saddle riding vehicle 100, and is attached to the front side of the saddle riding vehicle 100. The saddle riding vehicle 100 is provided, rearward of the headlamp unit 1, with an engine serving as a drive source that rotationally drives a drive wheel of the saddle riding vehicle 100, and a vehicle body frame that supports the engine. The engine includes, rearward of the headlamp unit 1, a radiator 102 that cools the heated engine with a refrigerant. The saddle riding vehicle 100 is further provided with a shroud for guiding a traveling air to the radiator 102.

The headlamp unit 1 of the present embodiment is supported by a bracket that supports a front fork. The headlamp unit 1 is angularly displaced with respect to the vehicle body frame together with the front fork along with a steering operation of a handle bar. The headlamp unit 1 according to the present embodiment can be disposed closer to the front fork as compared with a case where the headlamp unit 1 is fixed to the vehicle body frame. This arrangement can reduce the size of the headlamp unit 1 in the front-rear direction, thereby achieving weight reduction. Regarding the shape of the headlamp unit, a smaller size may be preferably. Furthermore, a front end of the headlamp unit 1 according to the present embodiment is positioned rearward with respect to a front wheel.

A dimension of the headlamp unit 1 in the vertical direction gradually increases from the front end toward the rearward direction. A dimension of the headlamp unit 1 in the left-right direction gradually increases from the front end toward the rearward direction (see FIG. 3).

Figure 2:
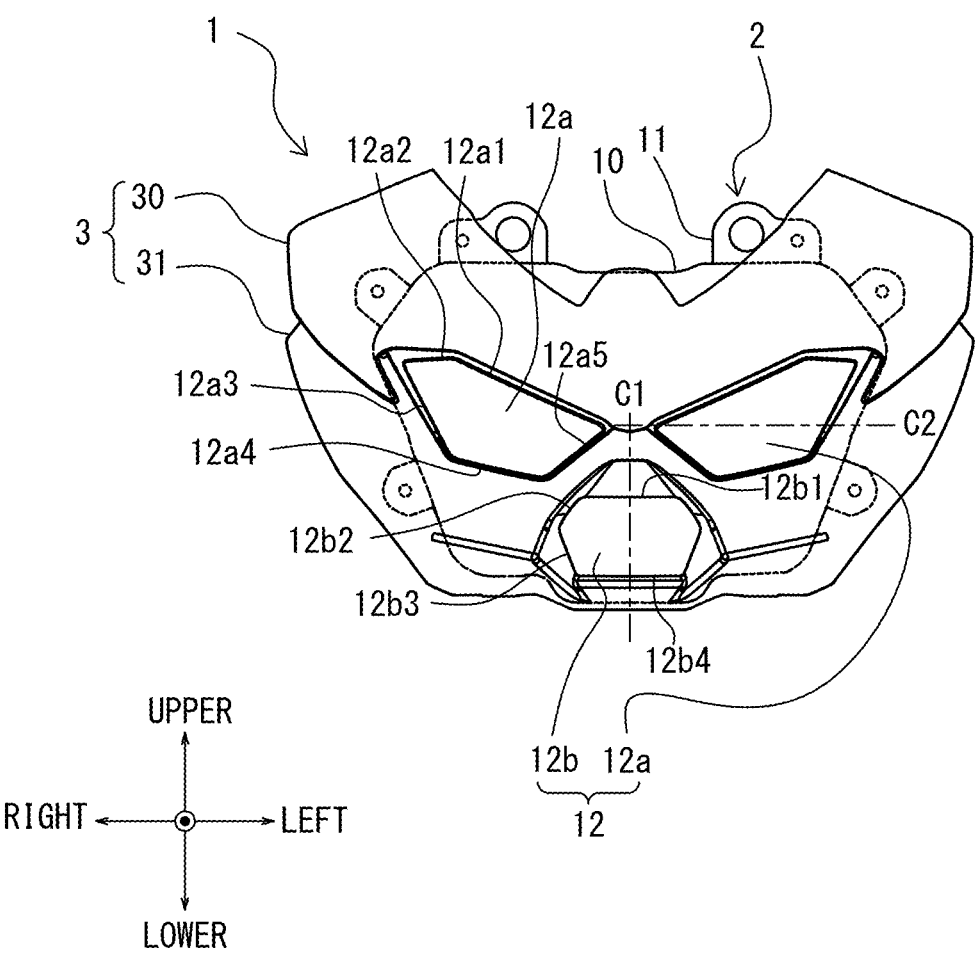
FIG. 2 is a front view of the headlamp unit according to the present embodiment.

FIG. 2 is a front view of the headlamp unit 1. The headlamp unit 1 includes a headlamp 2 and an upper cowl 3 covering the headlamp 2. The headlamp 2 is attached with an outer lens 12 that transmits light forward. The material of the outer lens 12 is a material having translucency; specifically; a transparent resin. The upper cowl 3 is not transparent and covers a region of the headlamp 2 except the outer lens 12.

The outer lens 12 has three portions. Specifically, the outer lens 12 includes: two low beam outer lenses 12a that transmit a low beam forward; and a single high beam outer lens 12b that transmits a high beam forward. The low beam outer lenses 12a and the high beam outer lens 12b are each formed separately from each other and are arranged at intervals from each other.

The low beam is a headlight to be used at the time of passing an oncoming vehicle, and, for example, is light irradiating ahead of the vehicle so that a traffic obstacle positioned at a distance of 40 m ahead can be recognized at night. The high beam is a headlight to be used at the time of traveling, and, for example, is light irradiating ahead of the vehicle so that a traffic obstacle located at a distance of 100 m ahead can be recognized at night. As described above, the irradiation direction of the high beam is set so that it is possible to recognize an obstacle at a greater distance as compared with the low beam. When traveling, the low beam is constantly lit and the high beam is lit as appropriate by an operation of the driver.

The two low beam outer lenses 12a are arranged side by side and, respectively, on the left and right, and are disposed, at an interval in the left-right direction, symmetrically with respect to a left-right center C1 of the headlamp 2 (the center line passing through the midpoint between the left end and the right end of a front housing 10 constituting the headlamp 2). The two low beam outer lenses 12a are disposed on a vertical center C2 of the headlamp 2 (the center line passing through the midpoint between the upper end and the lower end of the front housing 10). In other words, the vertical center C2 of the headlamp is positioned between the upper edges 12a1 and 12a2 and the lower edge 12a4 of the low beam outer lenses 12a. In a front view, the low beam outer lenses 12a each have a first upper edge 12a1 inclined upward from the inside in the left-right direction toward the outer side. The lower edge 12a4 of each low beam outer lens 12a is also inclined upward from the inside in the left-right direction toward the outer side.

The high beam outer lens 12b is positioned, in the left-right direction, between the two low beam outer lenses 12a. The high beam outer lens 12b is disposed symmetrically with respect to the left-right center C1 of the headlamp 2. Specifically, the high beam outer lens 12b is disposed on the right side with respect to the left end of the low beam outer lens 12a disposed on the left side, at the same time, is disposed on the left side with respect to the right end of the low beam outer lens 12a disposed on the right side, and is disposed below the lower ends of the two low beam outer lenses 12a with a space.

More specifically; an upper edge 12b1 of the high beam outer lens 12b is positioned on the right side with respect to a right end of the lower edge 12a4 of the low beam outer lens 12a disposed on the left side and, at the same time, on the left side with respect to a left end of the lower edge 12a4 of the low beam outer lens 12a disposed on the right side. In addition, the upper edge 12b1 of the high beam outer lens 12b is positioned below the lower edges 12a4 of the two low beam outer lenses 12a.

In addition, the outer ends in the left-right direction of the high beam outer lens 12b are positioned on the outer sides in the left-right direction with respect to the inner side ends in the left-right direction of the low beam outer lenses 12a. That is, in a top view, the high beam outer lens 12b has a portion overlapping the two low beam outer lenses 12a in the left-right direction. In a front view, the upper edge 12b1 and a lower edge 12b4 of the high beam outer lens 12b extend in parallel in the left-right direction.

Each low beam outer lens 12a has a substantially pentagonal shape in a front view, and the pentagonal shape is formed by a first upper edge 12a1 on the side of the left-right center C1 of the headlamp, a second upper edge 12a2 on the side opposite to the left-right center C1, a first side edge 12a3 on the side opposite to the left-right center C1, the lower edge 12a4, and a second side edge 12a5 on the side of the left-right center C1.

The second side edge 12a5 is inclined upward from the outer side in the left-right direction toward the inner side. Therefore, an angle between the first upper edge 12a1 and the second side edge 12a5 is an acute angle. Therefore, a dimension of the low beam outer lens 12a in the vertical direction (the distance in the vertical direction between the first upper edge 12a1 and the lower edge 12a4) on the outer side in the left-right direction is larger than a dimension of the low beam outer lens 12a in the vertical direction (the distance in the vertical direction between the first upper edge 12a1 and the second side edge 12a5) on the inner side in the left-right direction. Furthermore, in each low beam outer lens 12a, there is formed a region disposed on the outer side in the left-right direction with respect to the high beam outer lens 12b, and the region has a dimension in the vertical direction larger than the dimension of the high beam outer lens 12b in the vertical direction. As a result, the low beam outer lenses 12a can easily irradiate light outward in the left-right direction as compared with the high beam outer lens 12b.

The high beam outer lens 12b has a substantially hexagonal shape in a front view, and the hexagonal shape is formed by the upper edge 12b1, two upper side edges 12b2, two lower side edges 12b3, and the lower edge 12b4. In addition, the midpoint of the upper edge 12b1 and the midpoint of the lower edge 12b4 are positioned on the left-right center C1, and the center position of the high beam outer lens 12b coincides with the left-right center C1. Since the high beam outer lens 12b is disposed closer to the left-right center C1 in this manner, it is easier to irradiate light toward a relatively distant region ahead in the traveling direction as compared with the low beam outer lenses 12a.

The upper side edges 12b2 of the high beam outer lens 12b are inclined downward toward the outer sides in the left-right direction, and the inclination directions of the upper side edges 12b2 are the same as the inclination directions of the second side edges 12a5 of the low beam outer lenses 12a. Since the corresponding side edges 12b2 and 12a5 are inclined in the same directions, it is possible to easily secure the space along the inclination direction between the corresponding side edges 12b2 and 12a5, and to easily dispose the upper cowl 3 between the low beam outer lenses 12a and the high beam outer lens 12b.

In a front view, the area of the high beam outer lens 12b is smaller than the area of each low beam outer lens 12a.

In FIG. 1, the front end of the high beam outer lens 12b is disposed rearward with respect to the front ends of the low beam outer lenses 12a. In addition, the high beam outer lens 12b is inclined downward from the front end toward the rearward direction, forming a so-called inverted slant shape. Therefore, when the traveling air during traveling of the saddle riding vehicle 100 collides with the high beam outer lens 12b, the traveling air is guided rearward and downward along the inclination of the high beam outer lens 12b. In this case, the traveling air is guided toward the radiator 102 positioned rearward of and below the headlamp unit 1. As a result, the traveling air can be actively guided to the radiator 102.

The low beam outer lenses 12a are also inclined downward from the front ends toward the rearward direction, forming so-called inverted slant shapes. As a result, the low beam outer lenses 12a can be made inconspicuous. Furthermore, when the traveling air during traveling of the saddle riding vehicle 100 collides with the low beam outer lenses 12a, the traveling air is guided downward and outward in the left-right direction along the inclinations of the low beam outer lenses 12a. Therefore, the traveling air is prevented from flowing toward the upper side of the headlamp unit 1. Therefore, the flow of the traveling air toward the driver along the upper surface of the headlamp can be suppressed.

Figure 3:
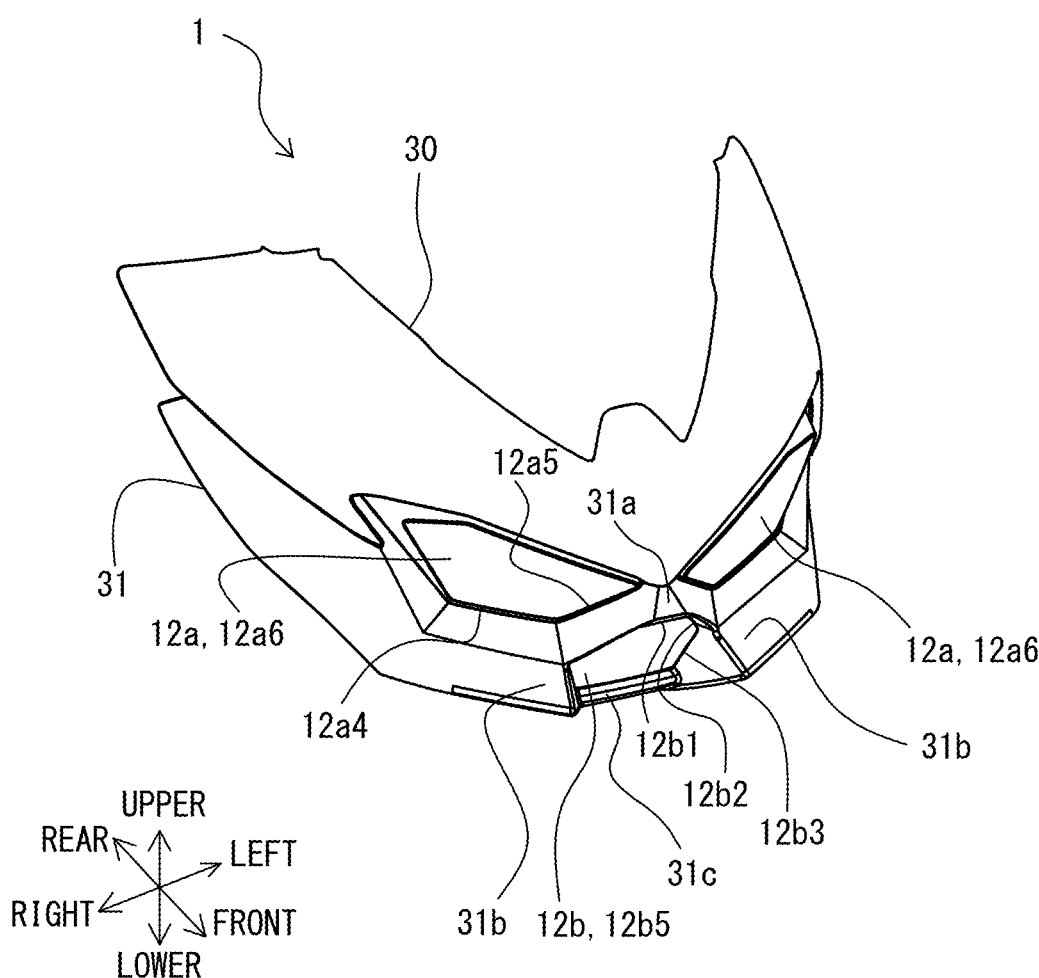
FIG. 3 is a perspective view of the headlamp unit according to the present embodiment.

FIG. 3 is a view of the headlamp unit 1 as viewed obliquely from above. In FIG. 3, the low beam outer lenses 12a are inclined rearward from the inner side ends in the left-right direction toward the outer sides in the left-right direction. Similarly, the headlamp 2 and the upper cowl 3 are inclined rearward from the inner side in the left-right direction toward the outer sides in the left-right direction. In addition, the headlamp 2 and the upper cowl 3 each have an upper surface inclined upward from the front end toward the rearward direction. As a result, the shape of the headlamp unit 1 as the saddle riding vehicle 100 can be made close to a streamline shape that guides the traveling air rearward.

The low beam outer lenses 12a each extend in the left-right direction and the vertical direction and in the front-rear direction and the vertical direction. In other words, in each low beam outer lens 12a, there is formed a main inclined surface 12a6 that is inclined outward in the left-right direction from the front end toward the rearward direction and is inclined rearward from the upper edges 12a1 and 12a2 toward the downward direction. The main inclined surfaces 12a6 are each a flat surface having a larger area than the other surface of the surface constituting the corresponding low beam outer lens 12a. The main inclined surfaces 12a6 are each a portion through which the low beam is transmitted.

The high beam outer lens 12b extends in the left-right direction and the vertical direction. In other words, in the high beam outer lens 12b, there is formed a main inclined surface 1265 that extends in the left-right direction and is inclined rearward from the upper edge 12b1 toward the downward direction. The main inclined surface 1265 is a portion through which the high beam is transmitted.

In FIG. 2, the upper cowl 3 includes a first upper cowl 30 covering an upper portion of the headlamp 2 and a second upper cowl 31 covering a lower portion of the headlamp 2.

The first upper cowl 30 is disposed along the upper edges 12a1 and 12a2 of the low beam outer lenses 12a, and the second upper cowl 31 is disposed along the side edges 12a3 and 12a5 and the lower edges 12a4 of the low beam outer lenses 12a.

The front end of the first upper cowl 30 is positioned ahead the front ends of the low beam outer lenses 12a. Specifically, the front end of the first upper cowl 30 protrudes forward along the upper edges 12a1 and 12a2 of the low beam outer lenses 12a. This arrangement can prevent the low beam outer lenses 12a from being exposed when the headlamp unit 1 is viewed by eyes from above.

As illustrated in FIG. 3, the second upper cowl 31 includes: a first protrusion 31a protruding forward from the second side edges 12a5 of the low beam outer lenses 12a along the upper edge 12b1 of the high beam outer lens 12b; and a pair of second protrusions 31b, respectively on the left and right, protruding forward from the lower edges 12a4 of the low beam outer lenses 12a along the side edges 12b2 and 12b3, respectively on the left and right, of the high beam outer lens 12b.

The first protrusion 31a covers the high beam outer lens 12b from above in a top view, and the second protrusions 31b cover the high beam outer lens 12b from the sides in a side view. In other words, the high beam outer lens 12b is disposed rearward with respect to the front end of the second upper cowl 31. Specifically, the high beam outer lens 12b is disposed rearward with respect to the first protrusion 31a. In addition, the high beam outer lens 12b is disposed rearward with respect to the left and right second protrusions 31b. As a result, the upper cowl 3 prevents the high beam outer lens 12b from being exposed in a top view and a side view.

The first protrusion 31a and the second protrusions 31b of the present embodiment protrude forward with respect to the low beam outer lenses 12a. As a result, it is possible to further suppress the high beam outer lens 12b from being exposed as compared with the case where the first protrusion 31a and the second protrusions 31b do not protrude with respect to the low beam outer lenses 12a. For example, external light such as sunlight or street light can be made less likely to enter the high beam outer lens 12b.

Of the second upper cowl 31, a portion covering a region between the second side edges 12a5 of the low beam outer lenses 12a and the upper side edges 12b2 of the high beam outer lens 12b extends along each of the side edges 12b2 and 12a5. As a result, it is possible to suppress a decrease in the width in the direction between the side edges 12b2 and the side edges 12a5, so that it is possible to make the portion easily protrude forward from the low beam outer lenses 12a.

The second upper cowl 31 further includes a third protrusion 31c protruding forward along the lower edge 12b4 of the high beam outer lens 12b. A forward protruding amount of the third protrusion 31c is smaller than a forward protruding amount of the first protrusion 31a. This arrangement can prevent the traveling air having collided with the high beam outer lens 12b from deviating upward and can guide the air toward the radiator 102 positioned below the headlamp unit 1. In addition, since the second protrusions 31b protrude from the left and right side edges 12b2 and 12b3 of the high beam outer lens 12b, it is also possible to suppress the traveling air from deviating in the left-right direction.

The lower surface of the first protrusion 31a, that is, the surface of the first protrusion 31a on the high beam outer lens 12b side is inclined downward from the front end toward the rearward direction. Furthermore, the inner surfaces in the left-right direction of the second protrusions 31b, that is, the surfaces of the second protrusions 31b on the sides of the high beam outer lens 12b are inclined inward in the left-right direction from the front ends toward the rearward direction. As a result, the high beam transmitted through the high beam outer lens 12b is hardly blocked by the first protrusion 31a or the second protrusions 31b, and the high beam can be irradiated over a wide range.

Of the second upper cowl 31, portions along the lower edges 12a4 of the low beam outer lenses 12a are inclined downward toward the front. Furthermore, portions along the first side edges 12a3 of the low beam outer lenses 12a are inclined outward in the left-right direction toward the front. In addition, portions along the second side edges 12a5 of the low beam outer lenses 12a are inclined inward in the left-right direction toward the front. As a result, the low beam transmitted through the low beam outer lenses 12a is hardly blocked by the above-mentioned portions, and the low beam can be irradiated over a wide range.

In FIG. 2, the headlamp 2 includes: a front housing 10 to which the outer lens 12 is attached; and a rear housing 11 attached to the front housing 10.

Figure 4:
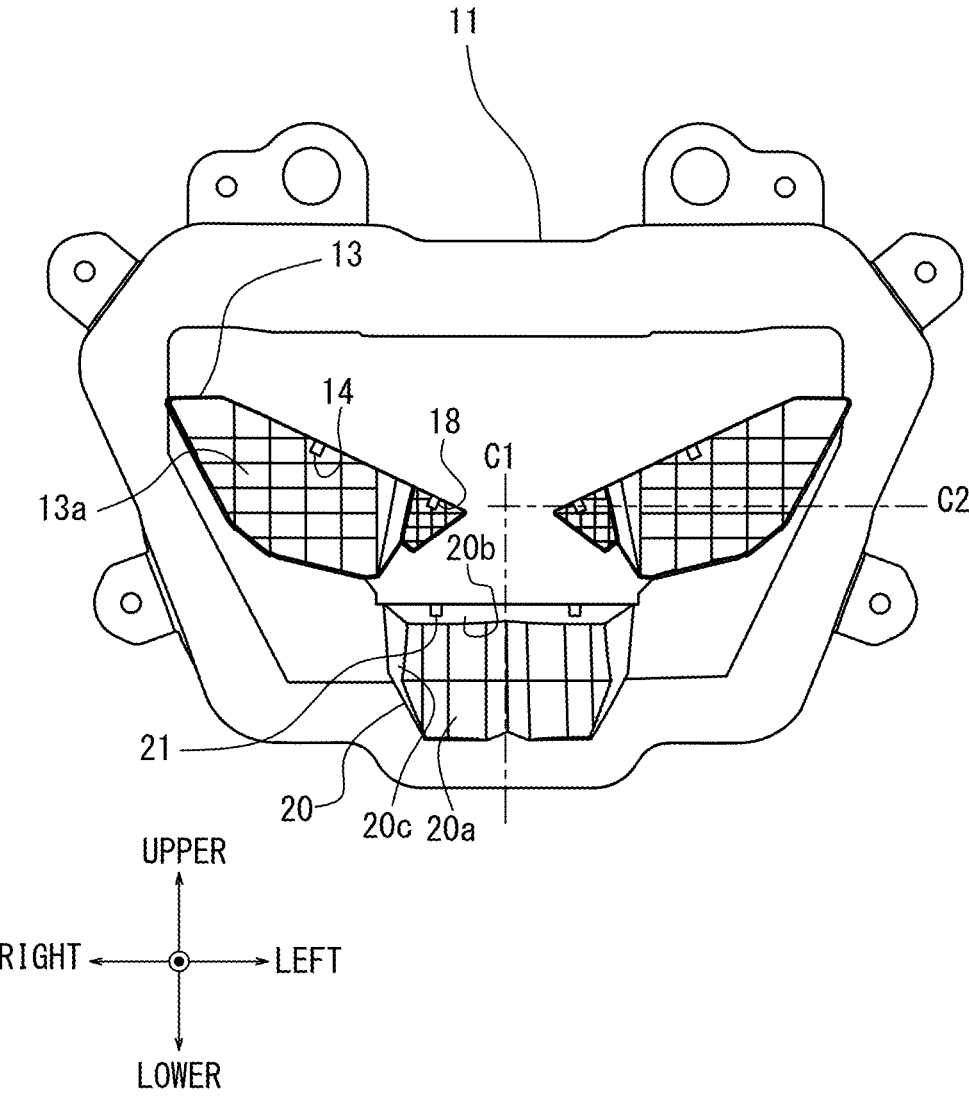
FIG. 4 is an exploded front view of a headlamp according to the present embodiment.

FIG. 4 is an exploded front view of the headlamp 2 from which the front housing 10 and the outer lens 12 are removed. The headlamp 2 is provided with: two low beam reflectors 13 disposed at positions corresponding, in a front view, to the two low beam outer lenses 12a; and a single high beam reflector 20 disposed at a position corresponding, in a front view, to the single high beam outer lens 12b.

Each low beam reflector 13 has a shape similar to that of the corresponding low beam outer lens 12a and has an upper edge inclined downward toward the left-right center C1, and the side edge on the left-right center C1 side is inclined upward toward the left-right center C1.

On an upper part of each of the two low beam reflectors 13, there is provided a low beam light source 14 that irradiates light for low beam toward the corresponding low beam reflector. Each low beam light source 14 is provided with a low beam substrate that supplies power to the low beam light source 14 and a low beam heat sink that cools the low beam substrate.

When the low beam light sources 14 irradiate the light for low beam toward the low beam reflectors 13, the low beam reflectors 13 reflect the light for low beam forward as the low beam. The low beam reflected forward by the low beam reflectors 13 passes through the low beam outer lenses 12a and is irradiated ahead of the saddle riding vehicle 100.

On the upper part of the two low beam reflectors 13, there are further provided position lamps 18 on the inner sides in the left-right direction with respect to the low beam light sources 14. As a result, it is possible to reduce the size of the low beam outer lenses 12a as compared with the case where the position lamps 18 are provided on the outer sides in the left-right direction of the upper parts of the low beam reflectors 13. The position lamps are lamps to notify that the saddle riding vehicle is present.

On an upper part of the high beam reflector 20, there are provided, side by side on the left and right, high beam light sources 21 that irradiate light for high beam toward the high beam reflector 20. Each high beam light source 21 is provided with a high beam substrate that supplies power to the high beam light sources 21 and a high beam heat sink that cools the high beam substrate. As the low beam light sources 14 and the high beam light sources 21 of the present embodiment, light-emitting diodes (LEDs) are used.

When the high beam light sources 21 irradiate light for high beam toward the high beam reflector 20, the high beam reflector 20 reflects the light for high beam forward as the high beam. The high beam reflected forward by the high beam reflector 20 passes through the high beam outer lens 12b and is irradiated ahead of the saddle riding vehicle 100.

The high beam light sources 21 are disposed, in a front view, on the right side with respect to the left end of the low beam reflector 13 disposed on the left side and, at the same time, on the left side with respect to the right end of the low beam reflector 13 disposed on the right side, and are disposed, in the vertical direction, between the two low beam reflectors 13 and the high beam reflector 20. In addition, the high beam reflector 20 and the high beam light sources 21 overlap the two low beam reflectors 13 in the left-right direction in a top view.

The high beam reflector 20 has a high beam reflection surface 20a and a non-reflective surface 20b. The high beam reflection surface 20a is opposed to the high beam light sources 21 from below, and reflects, forward, light emitted by the high beam light sources 21. The high beam reflection surface 20a is curved rearward and downward. The non-reflective surface 20b is provided a surface of the high beam reflector 20 excluding the high beam reflection surface 20a. The non-reflective surface 20b is positioned above the high beam reflection surface 20a and extends substantially flat in the front-rear and left-right directions. The high beam reflector 20 also has a pair of side surfaces 20c extending in the vertical direction at both ends, on the left and right, of the high beam reflection surface 20a and the non-reflective surface 20b.

The high beam reflection surface 20a is formed by, for example, vapor-depositing aluminum on the high beam reflector 20 made of resin. Furthermore, the non-reflective surface 20b is masked in the vapor deposition step, so that aluminum is not vapor-deposited on the non-reflective surface 20b. Therefore, aluminum gloss is formed on the high beam reflection surface 20a, and the non-reflective surface 20b shows the color of the resin material (for example, black). Therefore, the non-reflective surface 20b has a reflectance lower than the reflectance of the high beam reflection surface 20a.

Each low beam reflector 13 has, on its lower surface, a low beam reflection surface 13a that reflects the light for low beam forward. The low beam reflection surfaces 13a are each positioned below corresponding one of the low beam light sources 14, are inclined downward toward the front, and are curved rearward and downward. On each low beam reflection surface 13a, there is formed a reflection film through a vapor deposition step similarly to the high beam reflection surface 20a.

The light sources 14 and 21 and the reflectors 13 and 20 are supported by an aiming bracket for adjusting the irradiation direction of each beam. By adjusting the angle of the aiming bracket with respect to the housings 10 and 11, the irradiation directions of the low beam and the high beam are adjusted.

The headlamp unit 1 and the saddle riding vehicle 100 including the headlamp unit 1 according to the present embodiment have the following effects.

(1) Headlamp unit 1 includes:

two low beam outer lenses 12a that are arranged side by side on left and right at an interval and transmit a low beam forward; and a single high beam outer lens 12b that is disposed on a right side with respect to a left end of one of the two low beam outer lenses 12a that is disposed on a left side and, at a same time, on a left side with respect to a right end of one of the two low beam outer lenses 12a that is disposed on a right side, is disposed below the two low beam outer lenses 12a with a space, and transmits a high beam forward.

As a result, the sizes of the outer lenses 12a and 12b can be reduced as compared with a headlamp unit that irradiates a high beam and a low beam with one outer lens.

(2) The high beam outer lens 12b is disposed below the low beam outer lenses 12a and rearward with respect to front ends of the low beam outer lenses 12a.

As a result, the high beam outer lens 12b can be made inconspicuous particularly when the headlamp unit 1 is viewed from above or obliquely above. Since the light irradiated by the high beam is stronger than the light irradiated by the low beam, the high beam is relatively conspicuous. By making the high beam outer lens 12b inconspicuous as in the present embodiment, the headlamp unit 1 can be made to look smaller.

(3) The high beam outer lens 12b is inclined rearward toward a downward direction.

As a result, the area of the high beam outer lens 12b in a front view is smaller than the area of the high beam outer lens 12b as viewed from the direction orthogonal to the front surface of the high beam outer lens 12b. Therefore, it is possible to make the high beam outer lens 12b inconspicuous while securing an irradiation amount required for the high beam. In addition, the front surface of the high beam outer lens 12b is inclined rearward, a traveling air passing through the front surface of the high beam outer lens 12b is easily guided to the radiator 102 disposed rearward of the headlamp unit 1. As a result, the air is easily guided to the radiator 102 positioned rearward of and below the headlamp unit 1, thereby promoting cooling of the engine by the radiator 102.

(4) The headlamp unit 1 further includes:

a high beam light source 21 that irradiates light for high beam; and a high beam reflector 20 that is disposed at a position corresponding, in a front view, to the high beam outer lens 12*b* and reflects forward the light for high beam irradiated from the high beam light source 21, wherein the high beam reflector 20 includes:

a high beam reflection surface 20*a* that reflects forward the light for high beam; and a non-reflective surface 20*b* having a reflectance lower than a reflectance of the high beam reflection surface 20*a*.

As a result, in a case where the headlamp unit 1 is irradiated with light such as street light or the high beam reflector is irradiated inside the headlamp unit with the light for low beam, when the high beam is not lit, the light such as a street lamp or the light for low beam is hardly reflected by the high beam reflector 20 since the high beam reflector 20 has the non-reflective surface 20*b*, so that the high beam outer lens 12*b* can be made inconspicuous.

(5) The high beam outer lens 12*b* is disposed below the low beam outer lenses 12*a*, and the high beam light source 21 is disposed at an upper part of the high beam reflector 20.

As a result, the high beam light source is prevented from protruding below the high beam reflector, and the high beam reflector can be disposed as low as possible in the headlamp unit. As a result, the heights of the high beam reflector and the high beam outer lens are lowered, and the high beam outer lens can be made inconspicuous.

(6) The high beam outer lens 12*b* is disposed rearward with respect to front ends of the low beam outer lenses 12*a*, the high beam reflection surface 20*a* is opposed to the high beam light source 21 from below, and the non-reflective surface 20*b* is formed at least above the high beam reflection surface 20*a* among a surface of the high beam reflector 20 excluding the high beam reflection surface 20*a*.

As a result, when external light from below the headlamp unit 1, which is, for example, light reflected by a road surface, is applied to the high beam reflector 20, the reflection of the external light is suppressed by the non-reflective surface 20*b*. As a result, the high beam outer lens 12*b* can be made more inconspicuous.

(7) The headlamp unit 1 further includes:

a high beam light source 21 that irradiates light for high beam;

a high beam reflector 20 that is disposed at a position corresponding, in a front view, to the high beam outer lens 12*b* and reflects forward the light for high beam irradiated from the high beam light source 21;

two low beam light sources 14 that irradiate light for low beam; and two low beam reflectors 13 that are disposed, in a front view, at positions corresponding to the two low beam outer lenses 12*a* and reflect forward the light for low beam irradiated from the two low beam light sources 14, wherein the high beam light source 21 is disposed on a right side with respect to a left end of one of the two low beam reflectors 13 that is disposed on a left side and, at a same time, on a left side with respect to a right end of one of the two low beam reflectors 13 that is disposed on a right side, and is disposed, in a vertical direction, between the two low beam reflectors 13 and the high beam reflector 20.

As a result, the high beam light source 21 is prevented from protruding in the vertical direction with respect to the low beam reflectors 13 and the high beam reflector 20, and it is easy to further downsize the headlamp unit 1.

(8) The headlamp unit 1, further includes:

an outer lens 12 that includes two of the low beam outer lenses 12*a* and the high beam outer lens 12*b;* a headlamp 2 to which the outer lens 12 is attached; and an upper cowl 3 covering the headlamp 2, wherein the high beam outer lens 12*b* is disposed below the low beam outer lenses 12*a*, and the upper cowl 3 covers, in a top view, the high beam outer lens 12*b*.

As a result, since the upper cowl 3 covers above the high beam outer lens 12*b*, the high beam outer lens 12*b* can be made inconspicuous particularly when the headlamp unit 1 is viewed from above or obliquely above.

(9) The headlamp unit 1, further includes:

an outer lens 12 that includes two of the low beam outer lenses 12*a* and the high beam outer lens 12*b;* a headlamp 2 to which the outer lens 12 is attached; and an upper cowl 3 covering the headlamp 2, wherein the upper cowl 3 covers, in a side view, the high beam outer lens 12*b*.

As a result, since the side of the high beam outer lens 12*b* is covered by the upper cowl 3, the high beam outer lens 12*b* can be made inconspicuous particularly when the headlamp unit 1 is viewed from the side.

(10) A saddle riding vehicle 100 includes a headlamp unit 1, the headlamp unit 1 including:

two low beam outer lenses 12*a* that are arranged side by side on left and right at an interval and transmit a low beam forward; and a single high beam outer lens 12*b* that is disposed on a right side with respect to a left end of one of the two low beam outer lenses 12*a* that is disposed on a left side and, at a same time, on a left side with respect to a right end of one of the two low beam outer lenses 12*a* that is disposed on a right side, is disposed below the two low beam outer lenses 12*a* with a space, and transmits a high beam forward.

As a result, an aesthetic appearance of the saddle riding vehicle 100 including the headlamp unit 1 having the downsized outer lens 12 is improved.

Note that a headlamp unit and a saddle riding vehicle including the headlamp unit according to the present disclosure are not limited to the configuration of the above embodiment, and various modifications can be made.

Although a motorcycle is disclosed as a saddle riding vehicle in the present specification, the present invention may be applied to other saddle riding vehicles. For example, the saddle riding vehicle may be a three-wheeled vehicle or a four-wheeled buggy vehicle.

The saddle riding vehicle may use, as a drive source, an electric motor other than an engine, or may be a hybrid vehicle using both an electric motor and an engine.

As in the present embodiment, the headlamp unit is preferably supported by a bracket that is angularly displaced together with the front fork. The headlamp unit of the present disclosure is suitably used in a naked vehicle in which the engine is partially exposed. Note that the headlamp unit is not limited to the above. For example, the headlamp unit may be fixed to the vehicle body frame regardless of an angular displacement of the front fork.

The high beam is appropriately lit by an operation of the driver, but the present invention is not limited thereto. For example, the saddle riding vehicle may include a sensor that detects the surrounding situation, specifically, the presence or absence of an oncoming vehicle or a preceding vehicle.

In this case, the high beam may be operated as follows in accordance with a sensor output. The high beam may be turned off when it is determined that there is an oncoming vehicle or a preceding vehicle, and the high beam may lit when neither an oncoming vehicle nor a preceding vehicle is recognized.

The headlamp unit 1 of the present embodiment includes an upper cowl, but may not include an upper cowl. Although the upper cowl 3 of the present embodiment is divided into an upper part and lower part, the present invention is not limited thereto, and the upper cowl 3 may be in an integral structure, or it is possible to adopt another type of divided structure such as a left-right divided structure.

The high beam outer lens 12b is disposed below the two low beam outer lenses 12a with a space, but may be disposed above the two low beam outer lenses 12a with a space. Also in this case, each outer lens can be downsized.

The area of the high beam outer lens 12b is smaller than the area of each low beam outer lens 12a in a front view, so that the high beam outer lens 12b can be made inconspicuous. However, the area of the high beam outer lens 12b may be smaller than the total area of the two low beam outer lenses 12a in a front view. Also in this case, the high beam outer lens can be made inconspicuous.

The side surfaces 20c of the high beam reflector 20 are vapor-deposited with aluminum, but may not be vapor-deposited with aluminum, that is, may be non-reflective surfaces. In a case where the side surfaces 20c of the high beam reflector 20 are non-reflective surfaces, light such as street light is less likely to be reflected by the high beam reflector when the high beam is not lit, and the high beam outer lens can be made more inconspicuous.

The two high beam light sources 21 are provided on the upper part of the high beam reflector 20; however, when a single light source can meets required light for the high beam, a single high beam light source may be provided on the upper part of the high beam reflector 20.

The high beam light sources 21 are provided at upper parts of the high beam reflector 20, but may be provided lower parts of the high beam reflector.

SUPPLEMENTARY NOTE

A headlamp unit and a saddle riding vehicle including the headlamp unit according to the present disclosure provide the following aspects.

Aspect 1

A headlamp unit comprising:
two low beam outer lenses that are arranged side by side on left and right at an interval and transmit a low beam forward; and
a single high beam outer lens that is disposed on a right side with respect to a left end of one of the two low beam outer lenses that is disposed on a left side and, at a same time, on a left side with respect to a right end of one of the two low beam outer lenses that is disposed on a right side, is disposed above or below the two low beam outer lenses with a space, and transmits a high beam forward.

Aspect 2

The headlamp unit according to aspect 1, wherein the high beam outer lens is disposed below the low beam outer lenses and rearward with respect to front ends of the low beam outer lenses.

Aspect 3

The headlamp unit according to aspect 2, wherein the high beam outer lens is inclined rearward toward a downward direction.

Aspect 4

The headlamp unit according to any one of aspects 1 to 3, further comprising:
a high beam light source that irradiates light for high beam; and
a high beam reflector that is disposed at a position corresponding to the high beam outer lens in a front view and reflects forward the light for high beam irradiated from the high beam light source,
wherein the high beam reflector includes:
a high beam reflection surface that reflects forward the light for high beam; and
a non-reflective surface having a reflectance lower than a reflectance of the high beam reflection surface.

Aspect 5

The headlamp unit according to aspect 4, wherein
the high beam outer lens is disposed below the low beam outer lenses, and
the high beam light source is disposed at an upper part of the high beam reflector.

Aspect 6

The headlamp unit according to aspect 5, wherein
the high beam outer lens is disposed rearward with respect to front ends of the low beam outer lenses,
the high beam reflection surface is opposed to the high beam light source from below, and
the non-reflective surface is formed at least above the high beam reflection surface among a surface of the high beam reflector excluding the high beam reflection surface.

Aspect 7

The headlamp unit according to any one of aspects 1 to 6, further comprising:
a high beam light source that irradiates light for high beam;
a high beam reflector that is disposed at a position corresponding, in a front view, to the high beam outer lens and reflects forward the light for high beam irradiated from the high beam light source;
two low beam light sources that irradiate light for low beam; and
two low beam reflectors that are disposed, in a front view, at positions corresponding to the two low beam outer lenses and reflect forward the light for low beam irradiated from the two low beam light sources,
wherein the high beam light source is disposed on a right side with respect to a left end of one of the two low beam reflectors that is disposed on a left side and, at a same time, on a left side with respect to a right end of one of the two low beam reflectors that is disposed on a right side, and is disposed, in a vertical direction, between the two low beam reflectors and the high beam reflector.

Aspect 8

The headlamp unit according to any one of aspects 1 to 7, further comprising:
an outer lens that includes two of the low beam outer lenses and the high beam outer lens;
a headlamp to which the outer lens is attached; and
an upper cowl covering the headlamp,
wherein
the high beam outer lens is disposed below the low beam outer lenses, and
the upper cowl covers, in a top view, the high beam outer lens.

Aspect 9

The headlamp unit according to any one of aspects 1 to 8, further comprising:
an outer lens that includes two of the low beam outer lenses and the high beam outer lens;
a headlamp to which the outer lens is attached; and
an upper cowl covering the headlamp,
wherein the upper cowl covers, in a side view, the high beam outer lens.

Aspect 10

A saddle riding vehicle comprising a headlamp unit, the headlamp unit including
two low beam outer lenses that are arranged side by side on left and right at an interval and transmit a low beam forward, and
a single high beam outer lens that is disposed on a right side with respect to a left end of one of the two low beam outer lenses that is disposed on a left side and, at a same time, on a left side with respect to a right end of one of the two low beam outer lenses that is disposed on a right side, is disposed above or below the two low beam outer lenses with a space, and transmits a high beam forward.

What is claimed is:
1. A headlamp unit comprising:
two low beam outer lenses that are arranged side by side on left and right at an interval and transmit a low beam forward;
a single high beam outer lens that is disposed on a right side with respect to a left end of one of the two low beam outer lenses that is disposed on a left side and, at a same time, on a left side with respect to a right end of one of the two low beam outer lenses that is disposed on a right side, is disposed below the two low beam outer lenses with a space, and transmits a high beam forward;
an outer lens that includes two of the low beam outer lenses and the high beam outer lens;
a headlamp to which the outer lens is attached; and
an upper cowl covering the headlamp,
wherein the upper cowl covers, in a side view, the high beam outer lens.

2. The headlamp unit according to claim 1, wherein the high beam outer lens is disposed rearward with respect to front ends of the low beam outer lenses.

3. The headlamp unit according to claim 2, wherein the high beam outer lens is inclined rearward toward a downward direction.

4. The headlamp unit according to claim 1, further comprising:

a high beam light source that irradiates light for high beam; and
a high beam reflector that is disposed at a position corresponding to the high beam outer lens in a front view and reflects forward the light for high beam irradiated from the high beam light source,
wherein the high beam reflector includes:
a high beam reflection surface that reflects forward the light for high beam; and
a non-reflective surface having a reflectance lower than a reflectance of the high beam reflection surface.

5. The headlamp unit according to claim 4, wherein
the high beam outer lens is disposed below the low beam outer lenses, and
the high beam light source is disposed at an upper part of the high beam reflector.

6. The headlamp unit according to claim 5, wherein
the high beam outer lens is disposed rearward with respect to front ends of the low beam outer lenses,
the high beam reflection surface is opposed to the high beam light source from below, and
the non-reflective surface is formed at least above the high beam reflection surface among a surface of the high beam reflector excluding the high beam reflection surface.

7. The headlamp unit according to claim 1, further comprising:
a high beam light source that irradiates light for high beam;
a high beam reflector that is disposed at a position corresponding, in a front view, to the high beam outer lens and reflects forward the light for high beam irradiated from the high beam light source;
two low beam light sources that irradiate light for low beam; and
two low beam reflectors that are disposed, in a front view, at positions corresponding to the two low beam outer lenses and reflect forward the light for low beam irradiated from the two low beam light sources,
wherein the high beam light source is disposed on a right side with respect to a left end of one of the two low beam reflectors that is disposed on a left side and, at a same time, on a left side with respect to a right end of one of the two low beam reflectors that is disposed on a right side, and is disposed, in a vertical direction, between the two low beam reflectors and the high beam reflector.

8. The headlamp unit according to claim 1, further comprising:
an outer lens that includes two of the low beam outer lenses and the high beam outer lens;
a headlamp to which the outer lens is attached; and
an upper cowl covering the headlamp,
wherein the upper cowl covers, in a top view, the high beam outer lens.

9. A saddle riding vehicle comprising a headlamp unit according to claim 1.

10. A headlamp unit comprising:
two low beam outer lenses that are arranged side by side on left and right at an interval and transmit a low beam forward; and
a single high beam outer lens that is disposed on a right side with respect to a left end of one of the two low beam outer lenses that is disposed on a left side and, at a same time, on a left side with respect to a right end of one of the two low beam outer lenses that is disposed on a right side, is disposed above or below the two low beam outer lenses with a space, and transmits a high beam forward;

wherein the high beam outer lens is disposed below the low beam outer lenses and rearward with respect to front ends of the low beam outer lenses.

11. A headlamp unit comprising:

two low beam outer lenses that are arranged side by side on left and right at an interval and transmit a low beam forward;

a single high beam outer lens that is disposed on a right side with respect to a left end of one of the two low beam outer lenses that is disposed on a left side and, at a same time, on a left side with respect to a right end of one of the two low beam outer lenses that is disposed on a right side, is disposed above or below the two low beam outer lenses with a space, and transmits a high beam forward;

a high beam light source that irradiates light for high beam; and a high beam reflector that is disposed at a position corresponding to the high beam outer lens in a front view and reflects forward the light for high beam irradiated from the high beam light source, wherein the high beam reflector includes:

a high beam reflection surface that reflects forward the light for high beam; and a non-reflective surface having a reflectance lower than a reflectance of the high beam reflection surface, wherein the high beam outer lens is disposed below the low beam outer lenses, and the high beam light source is disposed at an upper part of the high beam reflector.

12. A headlamp unit comprising:

two low beam outer lenses that are arranged side by side on left and right at an interval and transmit a low beam forward;

a single high beam outer lens that is disposed on a right side with respect to a left end of one of the two low beam outer lenses that is disposed on a left side and, at a same time, on a left side with respect to a right end of one of the two low beam outer lenses that is disposed on a right side, is disposed above or below the two low beam outer lenses with a space, and transmits a high beam forward;

an outer lens that includes two of the low beam outer lenses and the high beam outer lens;

a headlamp to which the outer lens is attached; and an upper cowl covering the headlamp, wherein the high beam outer lens is disposed below the low beam outer lenses, and the upper cowl covers, in a top view, the high beam outer lens.

* * * * *